US009503152B2

(12) United States Patent
Jeng et al.

(10) Patent No.: US 9,503,152 B2
(45) Date of Patent: *Nov. 22, 2016

(54) METHODS AND APPARATUS FOR GENERATING COMPOSITE CODE SEQUENCES

(71) Applicant: The Boeing Company, Chicago, IL (US)

(72) Inventors: Isaac M. Jeng, Yorba Linda, CA (US); David K. Wen, Laguna Niguel, CA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/944,094

(22) Filed: Nov. 17, 2015

(65) Prior Publication Data

US 2016/0112088 A1 Apr. 21, 2016

Related U.S. Application Data

(63) Continuation of application No. 14/519,018, filed on Oct. 20, 2014, now Pat. No. 9,225,384.

(51) Int. Cl.
*H04B 1/00* (2006.01)
*H04B 1/707* (2011.01)
(Continued)

(52) U.S. Cl.
CPC ............... *H04B 1/707* (2013.01); *G01S 19/02* (2013.01); *H04J 13/102* (2013.01)

(58) Field of Classification Search
CPC ........ H04J 13/102; H04J 13/00; H04J 13/10; G01S 19/01; G01S 19/02; H04B 1/707; H04B 2201/70706; H04L 27/20; H04L 27/18
See application file for complete search history.

(56) References Cited

U.S. PATENT DOCUMENTS 8,126,082 B2 2/2012 Jeng
8,295,309 B2 10/2012 Jeng
(Continued)

FOREIGN PATENT DOCUMENTS

WO 0228044 A2 4/2002

OTHER PUBLICATIONS

Spilker et al., "Code Multiplexing via Majority Logic for GPS Modernization," Proceedings of the 11th International Technical Meeting of the Satellite Division of The Institute of Navigation, Sep. 15-17, 1998, 9 pgs.

(Continued)

*Primary Examiner* — Syed Haider
(74) *Attorney, Agent, or Firm* — Hanley, Flight & Zimmerman, LLC

(57) ABSTRACT

Methods and apparatus for generating composite code sequences are disclosed. An example method includes determining, via a determiner, a first number of samples to be contributed into a first unit duration of a composite code sequence from respective first, second, and third component code sequences; based on the first number of samples determined, randomly selecting, via a randomizer, the first number of samples from the respective ones of the first, second, and third component code sequences to enable the selected samples to more accurately represent the respective ones of the first, second, and third component code sequences; and compiling, via a compiler, the selected samples into the first unit duration of the composite code sequence by interspersing a sample from the first component code sequence between samples from the second component code sequence or between samples from the third component code sequence.

17 Claims, 8 Drawing Sheets

(51) Int. Cl.
 *H04J 13/10* (2011.01)
 *G01S 19/02* (2010.01)

(56) References Cited

U.S. PATENT DOCUMENTS

| | | | |
|---|---|---|---|
| 9,225,384 B1 | 12/2015 | Jeng et al. | |
| 2002/0150068 A1* | 10/2002 | Orr | H04B 1/707 370/335 |
| 2005/0229068 A1* | 10/2005 | Akopian | G06F 17/15 714/746 |
| 2008/0246655 A1* | 10/2008 | Winkel | H04B 1/707 342/357.48 |
| 2009/0033525 A1 | 2/2009 | Jeng | |
| 2009/0034645 A1 | 2/2009 | Jeng | |
| 2009/0232164 A1* | 9/2009 | Jeng | H04J 13/00 370/498 |
| 2011/0216852 A1 | 9/2011 | Kumar | |

OTHER PUBLICATIONS

United States Patent and Trademark Office, "Notice of Allowance", issued in connection with U.S. Appl. No. 14/519,018, mailed on Oct. 13, 2015, 26 pages.

United States Patent and Trademark Office, "Non-Final Office Action", issued in connection with U.S. Appl. No. 14/519,018, mailed on Apr. 23, 2015, 15 pages.

* cited by examiner

| Sample Index | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|
| Sample | 2 | 2 | 3 | 3 | 4 | 4 | 4 | 4 | 4 | 4 | 2 | 2 | 3 | 3 | 4 | 4 | 4 | 4 | 4 | 4 |
| After Randomizing Indices | 4 | 3 | 4 | 3 | 4 | 4 | 4 | 4 | 4 | 2 | 2 | 4 | 3 | 2 | 4 | 4 | 3 | 4 | 4 | 4 |
| Sample 2 Tally | 0 | 0 | 0 | 0 | 0 | 0 | 0 | 0 | 1 | 2 | 3 | 3 | 3 | 4 | 4 | 4 | 4 | 4 | 4 | 4 |
| Sample 3 Tally | 0 | 1 | 1 | 2 | 2 | 2 | 2 | 2 | 2 | 2 | 2 | 2 | 3 | 3 | 3 | 3 | 4 | 4 | 4 | 4 |
| Sample MV Tally | 1 | 1 | 2 | 2 | 3 | 4 | 5 | 6 | 6 | 6 | 6 | 7 | 7 | 7 | 8 | 9 | 9 | 10 | 11 | 12 |

| | | | | | | | | | | | | | | | | | | | | |
|---|---|---|---|---|---|---|---|---|---|---|---|---|---|---|---|---|---|---|---|---|
| Sample 2 Prob Est | 0.00 | 0.00 | 0.00 | 0.00 | 0.00 | 0.00 | 0.00 | 0.00 | 0.11 | 0.20 | 0.27 | 0.25 | 0.23 | 0.29 | 0.27 | 0.25 | 0.24 | 0.22 | 0.21 | 0.20 |
| Sample 3 Prob Est | 0.00 | 0.50 | 0.33 | 0.50 | 0.40 | 0.33 | 0.29 | 0.25 | 0.22 | 0.20 | 0.18 | 0.17 | 0.23 | 0.21 | 0.20 | 0.19 | 0.24 | 0.22 | 0.21 | 0.20 |
| Sample MV Prob Est | 1.00 | 0.50 | 0.67 | 0.50 | 0.60 | 0.67 | 0.71 | 0.75 | 0.67 | 0.60 | 0.55 | 0.58 | 0.54 | 0.50 | 0.53 | 0.56 | 0.53 | 0.56 | 0.58 | 0.60 |

| | | | | | | | | | | | | | | | | | | | |
|---|---|---|---|---|---|---|---|---|---|---|---|---|---|---|---|---|---|---|---|
| Sample 2 Prob Est Err | -0.20 | -0.20 | -0.20 | -0.20 | -0.20 | -0.20 | -0.09 | 0.00 | 0.07 | 0.05 | 0.03 | 0.09 | 0.07 | 0.05 | 0.04 | 0.02 | 0.01 | 0.00 | |
| Sample 3 Prob Est Err | -0.21 | 0.29 | 0.12 | 0.29 | 0.19 | 0.12 | 0.07 | 0.04 | 0.01 | -0.01 | -0.03 | 0.02 | 0.00 | -0.01 | -0.03 | 0.02 | 0.01 | -0.00 | -0.01 | |
| Sample MV Prob Est Err | 0.41 | -0.09 | 0.08 | -0.09 | 0.01 | 0.08 | 0.13 | 0.16 | 0.08 | 0.01 | -0.04 | -0.00 | -0.05 | -0.09 | -0.05 | -0.02 | -0.06 | -0.03 | -0.01 | 0.01 |

FIG. 8

| | | | | | | | | | | | | | | | | | | | |
|---|---|---|---|---|---|---|---|---|---|---|---|---|---|---|---|---|---|---|---|
| Sample 2 Prob Est Err Magnitude | 0.20 | 0.20 | 0.20 | 0.20 | 0.20 | 0.20 | 0.09 | 0.00 | 0.07 | 0.05 | 0.03 | 0.09 | 0.07 | 0.05 | 0.04 | 0.02 | 0.01 | 0.00 | |
| Sample 3 Prob Est Err Magnitude | 0.21 | 0.29 | 0.12 | 0.29 | 0.19 | 0.12 | 0.07 | 0.04 | 0.01 | 0.01 | 0.03 | 0.02 | 0.00 | 0.01 | 0.03 | 0.02 | 0.01 | 0.00 | 0.01 | |
| Sample MV Prob Est Err Magnitude | 0.41 | 0.09 | 0.08 | 0.09 | 0.01 | 0.08 | 0.13 | 0.16 | 0.08 | 0.01 | 0.04 | 0.00 | 0.05 | 0.09 | 0.05 | 0.02 | 0.06 | 0.03 | 0.01 | 0.01 |

FIG. 9

METHODS AND APPARATUS FOR GENERATING COMPOSITE CODE SEQUENCES

RELATED APPLICATION

This patent arises from a continuation of U.S. patent application Ser. No. 14/519,018, filed on Oct. 20, 2014. Priority is claimed of U.S. patent application Ser. No. 14/519,018. U.S. patent application Ser. No. 14/519,018 is incorporated herein by reference in its entirety.

FIELD OF THE DISCLOSURE

This disclosure relates generally to the Code Division Multiple Access Systems and, more particularly, to methods and apparatus for generating composite code sequences.

BACKGROUND

The Global Positioning System (GPS) is a space-based satellite navigation system that provides location and time information. In operation, the GPS transmits three binary phase shift key (BPSK) codes. To accommodate the transmission of three or more BPSK codes, in some examples, three component BPSK codes are combined into a composite BPSK code prior to being transmitted.

SUMMARY

An example method includes determining, via a determiner, a first number of samples to be contributed into a first unit duration of a composite code sequence from respective first, second, and third component code sequences; based on the first number of samples determined, randomly selecting, via a randomizer, the first number of samples from the respective ones of the first, second, and third component code sequences to enable the selected samples to more accurately represent the respective ones of the first, second, and third component code sequences; and compiling, via a compiler, the selected samples into the first unit duration of the composite code sequence by interspersing a sample from the first component code sequence between samples from the second component code sequence or between samples from the third component code sequence.

BRIEF DESCRIPTION OF THE DRAWINGS

FIGS. 6-9 are tables showing results obtained using the examples disclosed herein.

The figures are not to scale. Wherever possible, the same reference numbers will be used throughout the drawing(s) and accompanying written description to refer to the same or like parts.

DETAILED DESCRIPTION

Code division multiple access (CDMA) systems such as, for example, the Global Positioning System (GPS), can transmit binary phase shift key (BPSK) codes. To enable the transmission of three or more BPSK codes, in some examples, three BPSK codes are combined into a composite BPSK code prior to being transmitted. In some examples, the component BPSK codes are allotted different powers such that, for example, one of the component BPSK codes is more represented in the composite BPSK code than the other two component BPSK codes. The examples disclosed herein relate to combining component BPSK codes into one composite BPSK code using majority vote logic by determining the number of samples from each component BPSK code to be incorporated into the composite BPSK code per time duration and randomly selecting and placing the samples in the composite BPSK code to reliably represent the component BPSK codes.

In some examples, the composite BPSK code, which is the sequence to be transmitted, includes chips from each of the three component code sequences in a time-multiplexed fashion. In some examples, a chip, having a value of either +1 or −1, is sampled at a sampling rate such that there are multiple samples having a value of either +1 or −1 within a chip duration. In some examples, the sampling rate is at least twice the chip rate. Thus, in such examples, the composite sequence to be transmitted includes samples of chips from each of the three component code sequences in a time-multiplexed fashion.

Figure 1:
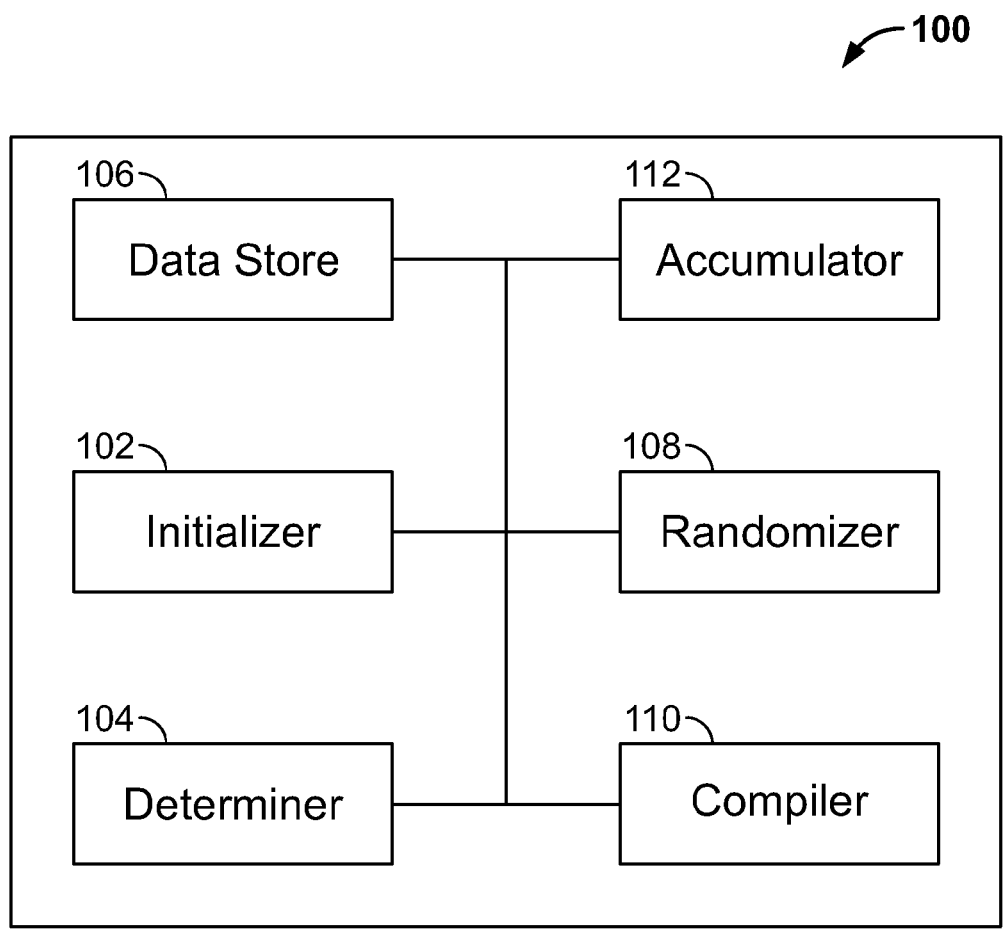
FIG. 1 illustrates an example apparatus that can be used to implement the examples disclosed herein.

FIG. 1 is an example apparatus 100 that can be used to create composite code sequences from different component code sequences and/or a majority vote (MV) sequence. In some examples, the different component code sequences include a first component code sequence, a second component code sequence and a third component code sequence. The MV sequence may be created based on the first, second and third component code sequences. In some examples, the MV sequence is formed on the basis of each sample. For example, the first sample in the MV sequence takes on the value of +1, if the first sample from at least two out of three of the component sequences takes on the value of +1. For example, the first sample in MV sequence takes on the value of −1, if the first sample from at least two out of three of the component sequences takes on the value of −1. In some such examples, the process repeats for each subsequent sample in the MV sequence.

In examples in which the apparatus 100 prepares a composite code sequence based on multiple unit durations, after an initializer 102 initializes the process (e.g., sets values to initial starting values, zero, etc.), a determiner 104 determines the number of samples to be incorporated into a first unit duration of the composite code sequence. The determiner 104 may determine the number of samples to be included in the first unit duration differently than when determining the number of samples to be included in a subsequent unit duration(s).

To determine the number of samples from the respective component code sequences to be incorporated into the first unit duration of the composite code sequence, the determiner 104 obtains component code sequences from a data store 106 and determines the number of samples to be incorporated into the first unit duration from the component sequence MV, the component sequence 2 and the component sequence 3. For example, the number of samples may be determined using Equations 1-4 in combination with Equations 5-10.

Equation 1 defines the number of samples in the first unit duration starting at an initialized time $t_0$, Equation 2 defines the number of samples being selected from the component sequence 2 rounded to the nearest integer, Equation 3 defines the number of samples being selected from the component sequence 3 rounded to the nearest integer and Equation 4 defines the number of samples being selected from the component sequence MV. Because Equations 2-4 round the determined value to the nearest integer, there may be a fraction of a sample more of the particular component code sequence included in the composite code sequence or a fraction of a sample less of the particular component code sequence included in the composite code sequence than determined prior to rounding. As shown below, Equations 12-14 account for the difference between the determined sample number and the rounded sample number in the subsequent unit durations.

Equation 5 defines the probability, $P_{MV}$, of a sample being selected from the Majority Vote (MV) sequence, Equation 6 defines the probability, $P_2$, of a sample being selected from component sequence 2 and Equation 7 defines the probability, $P_3$, of a sample being selected from component sequence 3. In some examples, component sequence 2 is the sequence with the second highest code power and sequence 3 is the sequence with the highest code power. Equation 8 defines the relationship between the component code probabilities of Equations 5-7 and the component code power ratios of Equations 9 and 10. Equations 9 and 10 describe the component code power ratios, $G_2$ and $G_3$, which are used in connection with Equations 5-7.

$$total_m = m = \text{number of samples in the 1st unit duration (starting at } t_0) \quad \text{Equation 1}$$

$$round(m * P_2) = \text{number of samples contributed from sequence 2 (the code sequence with the second highest code power)} \quad \text{Equation 2}$$

$$round(m * P_3) = \text{number of samples contributed from sequence 3 (the code sequence with the highest code power)} \quad \text{Equation 3}$$

$$m - round(m * P_2) - round(m * P_3) = \text{number of samples contributed from sequence } MV \quad \text{Equation 4}$$

$$P_{MV} = \frac{2}{\sqrt{G_3} + \sqrt{G_2}} \quad \text{Equation 5}$$

$$P_2 = P_{C/A} = \frac{\sqrt{G_2} - 1}{\sqrt{G_3} + \sqrt{G_2}} \quad \text{Equation 6}$$

$$P_3 = P_{L_{1CP}} = \frac{\sqrt{G_3} - 1}{\sqrt{G_3} + \sqrt{G_2}} \quad \text{Equation 7}$$

$$P_{MV} + P_3 + P_2 = \frac{2 + \sqrt{G_3} - 1 + \sqrt{G_2} - 1}{\sqrt{G_3} + \sqrt{G_2}} = 1 \quad \text{Equation 8}$$

$$G_2 = \frac{mid(PWR_3, PWR_2, PWR_1)}{min(PWR_3, PWR_2, PWR_1)} = \frac{PWR_2}{PWR_1} \quad \text{Equation 9}$$

$$G_3 \frac{mid(PWR_3, PWR_2, PWR_1)}{min(PWR_3, PWR_2, PWR_1)} = \frac{PWR_3}{PWR_1} \quad \text{Equation 10}$$

After the determiner 104 determines the number of samples to be incorporated into the first unit duration from the component sequence MV, the component sequence 2 and the component sequence 3, a randomizer 108 randomizes the sample indices and/or randomly selects the samples in the first unit duration to be included in the composite code sequence. In some examples, when the randomizer 108 selects the samples from the component code sequences to be included in the composite code sequence, the randomizer 108 verifies the same index is only selected from one of the component sequences in this unit duration (e.g., the same index is not selected from the same component sequence or from a different component sequence). For example, each selected sample has a unique index in a sequence of samples in a unit duration. Thus, if a sample selection of the randomizer 108 for the component sequence MV is the first index, then the first index has not been previously selected by the randomizer 108 for the component sequence MV, the component sequence 2 or the component sequence 3. In some examples, the randomizer 108 uses a uniform random number generator and a sort function to perform index randomization in accordance with the examples disclosed herein. In some examples, the randomizer 108 randomly selects all of the determined number of samples from one sequence (e.g., sequence MV) prior to randomly selecting samples from the subsequent sequences (e.g., the component sequence 2, the component sequence 3). In some examples, the randomizer 108 randomly selects the determined number of samples from the respective sequences until the determined number of samples from the respective sequences has been selected.

For example, the randomizer 108 may randomly select the component sequence 2 to be sampled and then randomly select a sample within the component sequence 2 and, after this selection, the randomizer 108 may randomly select the component sequence MV to be sampled and then randomly select a sample within the component sequence MV.

For example, if an example unit duration includes 10 indexed samples (e.g., 1, 2, 3, 4, etc.), the determiner 104 may determine n2=2 samples for the component sequence 2, n3=3 samples for the component sequence 3 and n4=5 samples for the component sequence MV, where n2+n3+n4=10. In some such examples, the randomizer 108 may select n2=2 samples from the component sequence 2, n3=3 samples from the component sequence 3, n4=5 samples from the component sequence MV randomly indexed as follows:

n2 samples from the component sequence 2 indexed as: 1, 2; n3 samples from the component sequence 3 indexed as: 3, 4, 5; n4 samples from the component sequence MV indexed as: 6, 7, 8, 9, 10; or n2 samples from the component sequence 2 indexed as: 3, 7; n3 samples from the component sequence 3 indexed as: 4, 6, 9; n4 samples from the component sequence MV indexed as: 1, 2, 5, 8, 10; or n2 samples from the component sequence 2 indexed as: 2, 4; n3 samples from the component sequence 3 indexed as: 3, 5, 9; or; n4 samples from the component sequence MV indexed as: 1, 7, 8, 9, 10.

After the randomizer 108 randomly selects the samples from the respective component code sequences, a compiler 110 compiles the selected samples into the first unit duration of the composite code sequence and an accumulator 112 tallies the number of samples contributed from the respective component code sequences. The first unit duration and the tallies may be stored in the data store 106.

To determine the number of samples from the respective component code sequences to be incorporated into a subsequent unit duration of the composite code sequence, the determiner 104 obtains component code sequences and the tallies of the sample contribution from the respective component code sequences from the data store 106 and determines the number of samples to be incorporated into the subsequent unit duration of the component code sequence using Equations 11-14. In some examples, using the tallies when determining the number of samples to be contributed from the respective sequences substantially accounts for sample overrun that may occur when rounding up to the nearest integer or sample underrun that may occur when rounding down to the nearest integer.

Equation 11 defines the number of samples in all unit durations since $t_0$ including the next unit duration. Equation 12 defines the number of samples being selected from the component sequence 2 in the next unit duration rounded to the nearest integer based on the number of samples to be contributed including the next unit duration (based on the determined probability) and the number of samples previously contributed. Thus, as shown in Equation 12, the overrun and underrun are accounted for by subtracting the number of samples previously contributed from the rounded total number of samples including the next unit duration. Equation 13 defines the number of samples being selected from the component sequence 3 in the next unit duration rounded to the nearest integer based on the probability of the number of samples to be contributed including the next unit duration (based on the determined probability) and the number of samples previously contributed. Equation 14 defines the number of samples being selected from the component sequence MV in the next unit duration rounded to the nearest integer based on the probability of the number of samples to be contributed including the next unit duration (based on the determined probability) and the number of samples previously contributed.

$$\text{total}_m = \text{total}_{\bar{m}} + m = \text{total number of samples in all unit durations since } t_0 \text{ including the next duration} \quad \text{Equation 11}$$

$$\text{round}(\text{total}_m * P_2) - \text{samples from sequence 2 in all previous unit durations} = \text{number of samples contributed from sequence 2 into next unit duration} \quad \text{Equation 12}$$

$$\text{round}(\text{total}_m * P_3) - \text{samples from sequence 3 in all previous unit durations} = \text{number of samples contributed from sequence 3 into next unit duration} \quad \text{Equation 13}$$

$$\text{total}_m - \text{round}(\text{total}_m * P_2) - \text{round}(\text{total}_m * P_3) - \text{samples contributed from sequence MV} = \text{number of samples contributed from sequence MV into next unit duration} \quad \text{Equation 14}$$

After the determiner 104 determines the number of samples to be incorporated into the subsequent unit duration from the component sequence MV, the component sequence 2 and the component sequence 3, the randomizer 108 randomizes the sample indices and/or randomly selects the samples to be included in the composite code sequence in the next unit duration. Based on the selections made by the randomizer 108, the compiler 110 compiles the selected samples into the subsequent unit duration of the composite code sequence and the accumulator 112 tallies the number of samples contributed from the respective component code sequences. The subsequent unit duration and the tallies may be stored in the data store 106.

Equations 15-17 may be used to determine an estimate of the probability of the sample being from one of the component code sequences within a given unit duration starting from the initialized time, $t_0$, using the example time-weighted sample-index randomized approach as disclosed herein.

$$P_{MV,est} = \frac{\text{number of samples in the given duration starting from } t_0 \text{ contributed from the sequence } MV}{\text{total number of samples within the same given duration}} \quad \text{Equation 15}$$

$$P_{2,est} = \frac{\text{number of samples in the given duration starting from } t_0 \text{ contributed from sequence 2}}{\text{total number of samples within the same given duration}} \quad \text{Equation 16}$$

$$P_{3,est} = \frac{\text{number of samples in the given duration starting from } t_0 \text{ contributed from sequence 3}}{\text{total number of samples within the same given duration}} \quad \text{Equation 17}$$

In some examples, Equation 12 substantially ensures that the number of samples from the component sequence 2 in the unit duration starting from $t_0$ to the end of any one unit duration is equal or substantially equal to the rounded product of Equation 16 multiplied by the number samples in the same unit duration. In some examples, Equation 13 substantially ensures that the number of samples from the component sequence 3 in the unit duration starting from $t_0$ to the end of any one unit duration is equal or substantially equal to the rounded product of Equation 17 multiplied by the number samples in the same unit duration. In some examples, Equation 14 substantially ensures that the number of samples from the component sequence MV in the unit duration starting from $t_0$ to the end of any one unit duration is equal or substantially equal to the rounded product of Equation 15 multiplied by the number samples in the same unit duration. Thus, the number of samples from component code sequences in the same unit duration is equal or substantially equal to the respective probably estimate from Equations 15-17 times the number of samples in the same unit duration regardless of the time elapsed from $t_0$.

Equations 18-20 define the error in the probably estimates of Equations 15-17.

$$P_{MV,err} = \frac{\text{number of samples in the given duration starting from } t_0 \text{ contributed from sequence } MV}{\text{total number of samples within the same given duration}} - P_{MV} \quad \text{Equation 18}$$

$$P_{3,err} = \frac{\text{number of samples in the given duration starting from } t_0 \text{ contributed from sequence 3}}{\text{total number of samples within the same given duration}} - P_3 \quad \text{Equation 19}$$

$$P_{2,err} = \frac{\text{number of samples in the given duration starting from } t_0 \text{ contributed from sequence 2}}{\text{total number of samples within the same given duration}} - P_2 \quad \text{Equation 20}$$

While an example manner of implementing the apparatus 100 is illustrated in FIG. 1, one or more of the elements, processes and/or devices illustrated in FIG. 1 may be combined, divided, re-arranged, omitted, eliminated and/or implemented in any other way. Further, the example initializer 102, the determiner 104, the data store 106, the example randomizer 108, the example compiler 110 and the example accumulator 112 and/or, more generally, the example apparatus 100 of FIG. 1 may be implemented by hardware, software, firmware and/or any combination of hardware, software and/or firmware. Thus, for example, any of the example initializer 102, the determiner 104, the data store 106, the example randomizer 108, the example compiler 110 and the example accumulator 112 and/or, more generally, the example apparatus 100 of FIG. 1 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example the example initializer 102, the determiner 104, the data store 106, the example randomizer 108, the example compiler 110 and the example accumulator 112 is/are hereby expressly defined to include a tangible computer readable storage device or storage disk such as a memory, a digital versatile disk (DVD), a compact disk (CD), a Blu-ray disk, etc. storing the software and/or firmware. Further still, the example apparatus 100 may include one or more elements, processes and/or devices in addition to, or instead of, those illustrated, and/or may include more than one of any or all of the illustrated elements, processes and devices.

Figure 2:
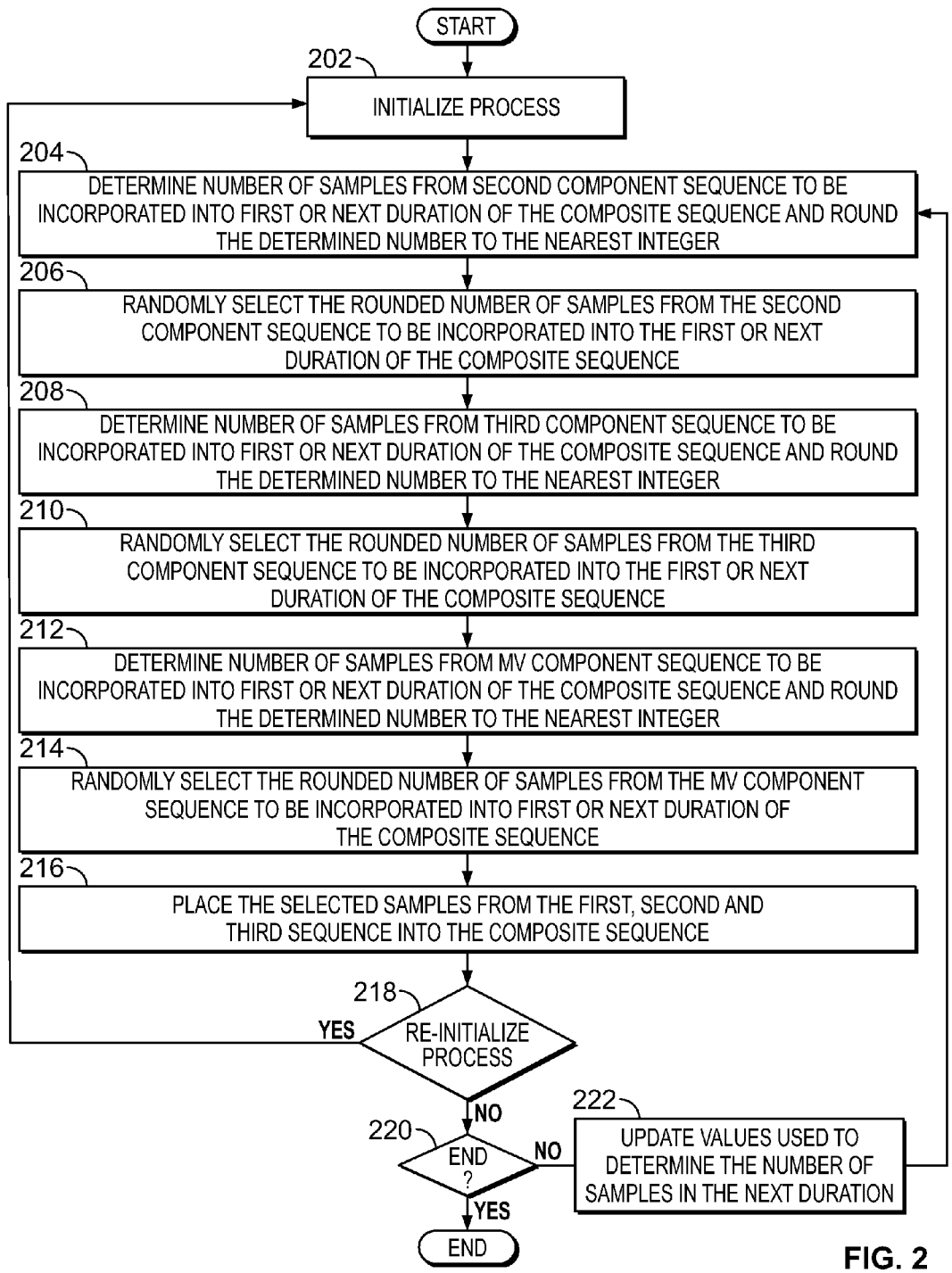
FIGS. 2 and 3 are flowcharts representative of methods that may be performed to implement the apparatus of FIG. 1.

A flowchart representative of an example method for implementing the apparatus 100 of FIG. 1 is shown in FIG. 2. In this example, the method may be implemented using the machine readable instructions that comprise a program for execution by a processor such as the processor 1012 shown in the example processor platform 1000 discussed below in connection with FIG. 10. The program may be embodied in software stored on a tangible computer readable storage medium such as a CD-ROM, a floppy disk, a hard drive, a digital versatile disk (DVD), a Blu-ray disk, or a memory associated with the processor 1012, but the entire program and/or parts thereof could alternatively be executed by a device other than the processor 1012 and/or embodied in firmware or dedicated hardware. Further, although the example program is described with reference to the apparatus illustrated in FIG. 1, many other methods of implementing the example apparatus 100 may alternatively be used. For example, the order of execution of the blocks may be changed, and/or some of the blocks described may be changed, eliminated, or combined.

As mentioned above, the example method of FIG. 2 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any unit duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and transmission media. As used herein, "tangible computer readable storage medium" and "tangible machine readable storage medium" are used interchangeably. Additionally or alternatively, the example method of FIG. 2 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any unit duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and transmission media. As used herein, when the phrase "at least" is used as the transition term in a preamble of a claim, it is open-ended in the same manner as the term "comprising" is open ended.

Figure 3:
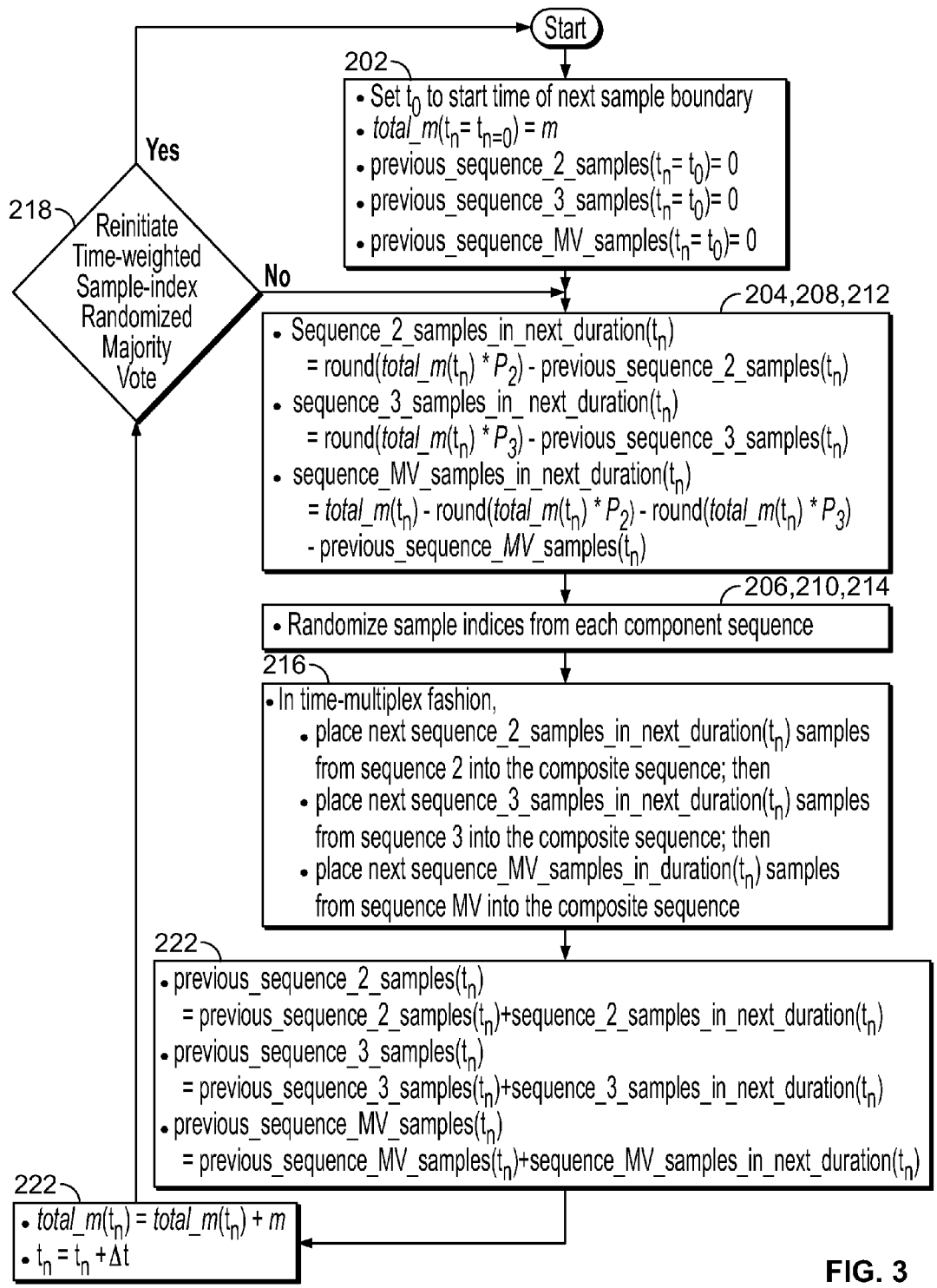
Figure 4:
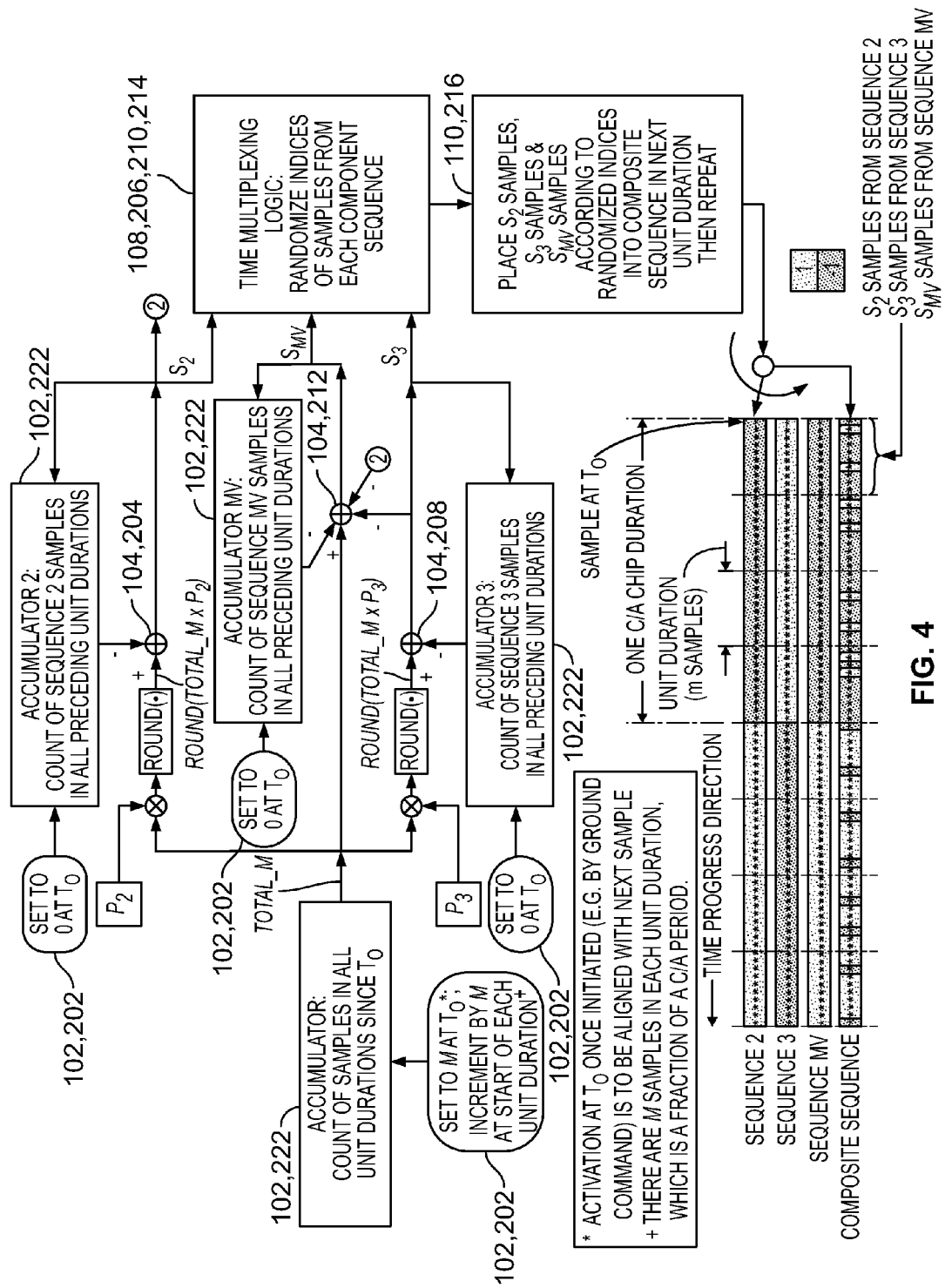
FIG. 4 is a flow diagram representative of a method that may be performed to implement the apparatus of FIG. 1.
Figure 5:
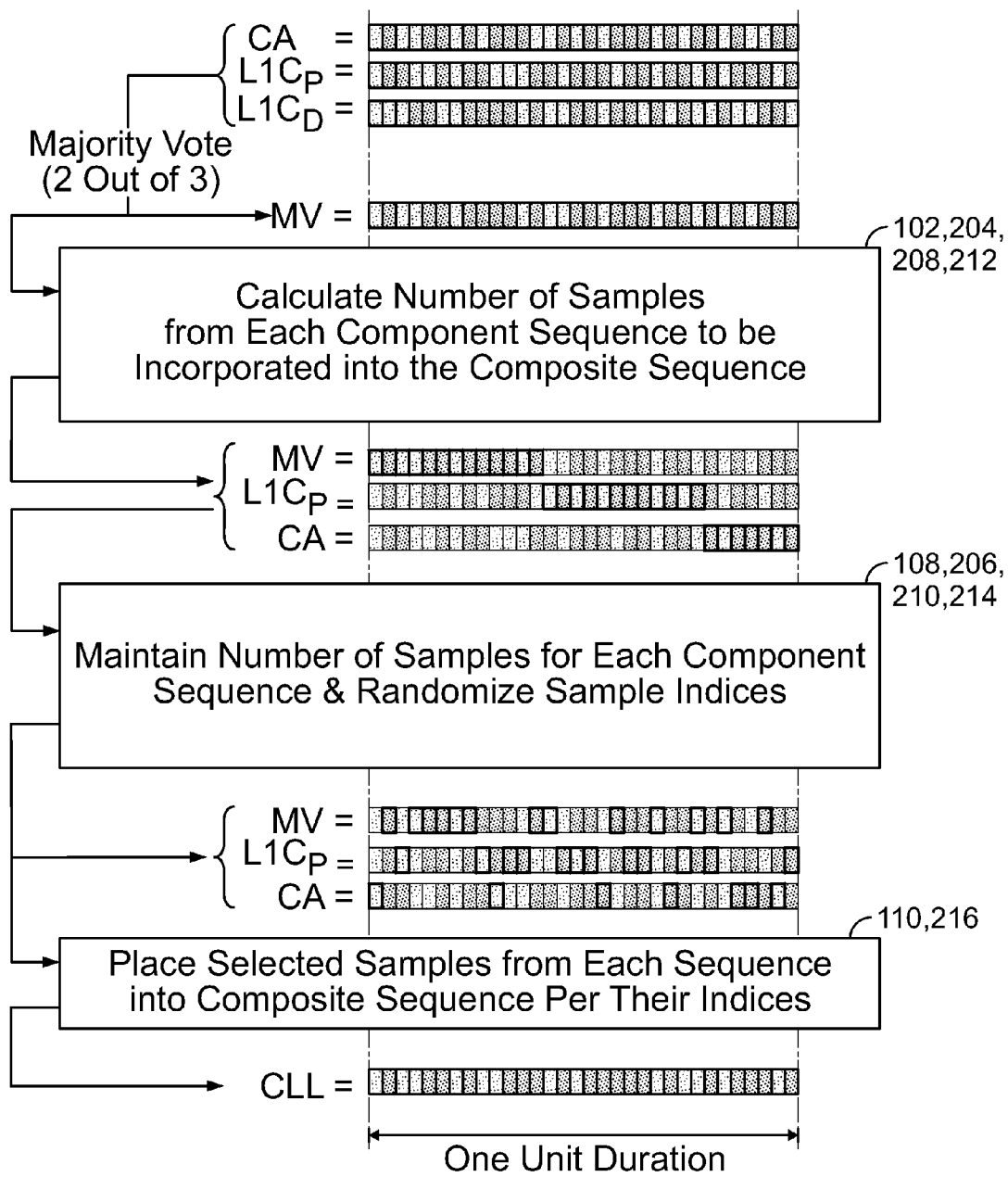
FIG. 5 is an example representation of a method that may be performed to implement the apparatus of FIG. 1.

The method of FIG. 2 will be described in combination with FIGS. 3-5 where FIGS. 3-5 are flow diagrams depicting portions of the method of FIG. 2 in more detail. The method of FIG. 2 may begin with the initializer 102 initializing the process (block 202). In some examples, initializing the process includes setting the values of different inputs to zero and/or to their initial starting values. For example, the initializer 102 may set the start time of the next sample boundary to the initialized time, $t_0$, set the total number of samples to the number of samples in the first unit duration, $total_m(t_n=0)=m$, set the number of samples contributed from all previous unit durations for the component sequence 2 to zero, previous sequence 2 samples $(t_n=t_0)=0$, set the number of samples contributed from all previous unit durations for component sequence 3 to zero, previous sequence 3 samples $(t_n=t_0)=0$, and set the number of samples contributed from all previous unit durations for component sequence MV to zero, previous sequence MV samples $(t_n=t_0)=0$.

The determiner 104 then determines the number of samples from the second component code sequence to be incorporated into the first or next unit duration of the composite sequence and rounds the determined value to the nearest integer (block 204). In some examples, the determiner 104 determines the number of samples using Equation 21. In examples in which the determiner 104 determines the samples from the second component code sequence to be incorporated into the first unit duration, the value of the previous sequence 2 samples $(t_n)$ equals zero. In examples in which the determiner 104 is determining the samples from the second component code sequence to be incorporated into the next unit duration (e.g., not the first unit duration), the value of the previous sequence 2 samples $(t_n)$ may equal a value other than zero.

sequence 2 samples in next duration $(t_n)$=round ($total_m(t_n)*P_2$)–previous sequence 2 samples $(t_n)$  Equation 21

The randomizer 108 then randomly selects the samples and/or indices from the second component code sequence to be incorporated into the composite sequence (block 206).

The determiner 104 then determines the number of samples from the third component code sequence to be incorporated into the first or next unit duration of the composite sequence and rounds the determined value to the nearest integer (block 208). In some examples, the determiner 104 determines the number of samples using Equation 22. In examples in which the determiner 104 determines the samples from the third component code sequence to be incorporated into the first unit duration, the value of the previous sequence 3 samples $(t_n)$ equals zero. In examples in which the determiner 104 determines the samples from the third component code sequence to be incorporated into the next unit duration (e.g., not the first unit duration), the value of the previous sequence 3 samples $(t_n)$ may equal a value other than zero.

sequence 3 samples in next duration $(t_n)$=round ($total_m(t_n)*P_3$)–previous sequence 3 samples $(t_n)$  Equation 22

The randomizer 108 then randomly selects the samples and/or indices from the third component code sequence to be incorporated into the composite sequence (block 210).

The determiner 104 then determines the number of samples from the MV component code sequence to be incorporated into the first or next unit duration of the composite sequence and rounds the determined value to the nearest integer (block 212). In some examples, the determiner 104 determines the number of samples using Equation 23. In examples in which the determiner 104 determines the samples from the MV component code sequence to be incorporated into the first unit duration, the value of the previous sequence MV samples ($t_n$) equals zero. In examples in which the determiner 104 determines the samples from the MV component code sequence to be incorporated into the next unit duration, the value of the previous sequence MV samples ($t_n$) may equal a value other than zero.

$$\text{sequence MV samples in next duration } (t_n) = \text{total}_m (t_n) - \text{round}(\text{total}_m(t_n) * P_2) - \text{round}(\text{total}_m(t_n) * P_3) - \text{previous sequence MV samples } (t_n) \quad \text{Equation 23}$$

The randomizer 108 then randomly selects the samples and/or indices from the MV component code sequence to be incorporated into the composite sequence (block 214). The compiler 110 then places the selected samples from the second, third and MV sequences into the composite sequence (block 216). At block 218, the processor 1000 determines whether or not to re-initialize the process. At block 220, the processor 1000 determines whether not to end the process of FIG. 2. If the processor 1000 determines to continue the process after block 220, the determiner 104 updates and/or determines the numbers to be used when determining the number of samples in the next unit duration (block 222). For example, the determiner 104 may determine the previous sequence 2 samples ($t_n$) based on Equation 24 that includes incorporating the fractional sample overrun/underrun due to rounding in the second component sequence in the current duration into the composite sequence of the next duration. For example, the determiner 104 may determine the
previous sequence 3 samples ($t_n$) based on Equation 25 that includes incorporating the fractional sample overrun/underrun due to rounding in the third component sequence in the current duration into the composite sequence of the next duration. For example, the determiner 104 may determine the previous sequence MV samples ($t_n$) based on Equation 26 that includes incorporating the fractional sample overrun/underrun due to rounding in the MV component sequence in the current duration into the composite sequence of the next duration. Further, the determiner 104 may update the total$_m$ ($t_n$) by the number of samples in the next unit duration represented by Equation 27 and update $t_n$ as represented by Equation 28.

$$\text{previous sequence 2 samples } (t_n) = \text{previous sequence 2 samples } (t_n) + \text{sequence 2 samples in next duration } (t_n) \quad \text{Equation 24}$$

$$\text{previous sequence 3 samples } (t_n) = \text{previous sequence 3 samples } (t_n) + \text{sequence 3 samples in next duration } (t_n) \quad \text{Equation 25}$$

$$\text{previous sequence MV samples } (t_n) = \text{previous sequence MV samples } (t_n) + \text{sequence MV samples in next duration } (t_n) \quad \text{Equation 26}$$

$$\text{total}_m(t_n) = \text{total}_m(t_n) + m \quad \text{Equation 27}$$

$$t_n = t_n + \Delta t \quad \text{Equation 28}$$

FIG. 6 is a table 600 showing samples and sample tallies in two unit durations that illustrates the samples contributed by the component code sequences based on the probabilities $P_2$, $P_3$ and $P_{MV}$. Referring to the table 600, the component sequence 2 is represented by a 2 in the table 600, the component sequence 3 is represented by a 3 in the table 600 and the component sequence MV is represented by a 4 in the table 600.

FIG. 7 is a table 700 showing probability estimates for sample times. As illustrated in FIG. 7, the probability estimates for $P_{MV,est}$, $P_{2,est}$ and $P_{3,est}$ converge toward the end of each unit duration.

FIG. 8 is a table 800 showing the error for the probability estimates. In this example, the probability estimates converge to zero toward the end of each unit duration and concentrate closely. As shown and as provided by the example time-weighted sample-index randomized approach, the deviations from zero at the beginning of each subsequent unit duration decreases with time. In some examples, the mean of the error for the probability estimates and the standard deviation of the error for the probability estimates using the examples disclosed herein may be relatively small as compared to some known approaches. In some examples, cumulative distribution function of the error for the probability estimates using the examples disclosed herein may be relatively small as compared to some known approaches.

FIG. 9 is a table 900 showing the magnitudes of the probability estimates. In some examples, for the probability estimates to converge to zero toward the end of each duration, the contributed samples from the component code sequences include a set of samples from the first component code sequence, a set of samples from the second component code sequence and a set of samples from the third component code sequence that each satisfy Equations 5-7, respectively. The orders of the component code sequences may be received in any order enabling each unit duration to start with any one sample from any component code sequence and for the unit duration to start at any time (e.g., not at a fixed time instant such as a coarse acquisition (C/A) chip boundary or any other chip boundary). In some example, if the beginning of a unit duration shifts, the convergence behavior may shift accordingly but may not significantly vary in that probability estimates converge toward zero toward the end of each unit duration. In some applications, users may re-initialize to start unit duration in the middle of an ongoing unit duration. For example, unit duration 1 is ongoing, but is re-initialized such that the new unit duration 1 starts half way through the ongoing unit duration 1 where to was originally set to 0 at the beginning of ongoing unit duration 1. However, the unit duration it is reset to be 0 again to denote the beginning of the new unit duration 1 in the middle of ongoing unit duration 1. In this case, the beginning of a unit duration shifts toward positive time direction and, therefore, the convergence behavior shifts toward positive time direction accordingly.

Figure 10:
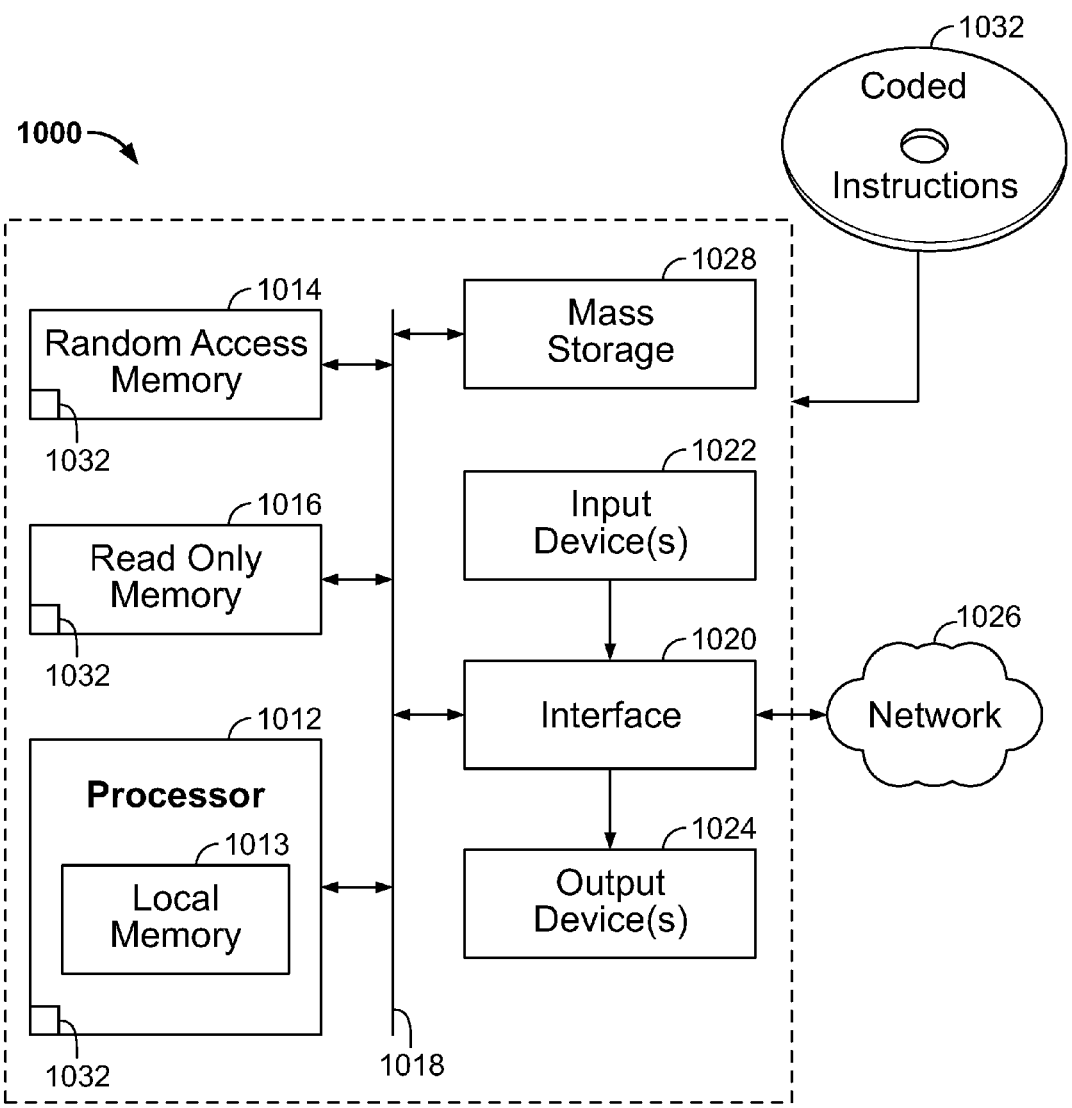
FIG. 10 is a processor platform that may be used to implement the examples described herein.

FIG. 10 is a block diagram of an example processor platform 1000 capable of executing instructions to implement the methods of FIGS. 2-5 and the apparatus 100 of FIG. 1. The processor platform 1000 can be, for example, a server, a personal computer, a mobile device (e.g., a cell phone, a smart phone, a tablet such as an iPad™), a personal digital assistant (PDA), an Internet appliance, or any other type of computing device.

The processor platform 1000 of the illustrated example includes a processor 1012. The processor 1012 of the illustrated example is hardware. For example, the processor 1012 can be implemented by one or more integrated circuits, logic circuits, microprocessors or controllers from any desired family or manufacturer.

The processor 1012 of the illustrated example includes a local memory 1013 (e.g., a cache). The processor 1012 of the illustrated example is in communication with a main memory including a volatile memory 1014 and a non-volatile memory 1016 via a bus 1018. The volatile memory 1014 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1016 may be implemented by flash memory and/or any other desired type of memory device. Access to the main memory 1014, 1016 is controlled by a memory controller.

The processor platform 1000 of the illustrated example also includes an interface circuit 1020. The interface circuit 1020 may be implemented by any type of interface standard, such as an Ethernet interface, a universal serial bus (USB), and/or a PCI express interface.

In the illustrated example, one or more input devices 1022 are connected to the interface circuit 1020. The input device(s) 1022 permit(s) a user to enter data and commands into the processor 1012. The input device(s) can be implemented by, for example, an audio sensor, a microphone, a keyboard, a button, a mouse, a touchscreen, a track-pad, a trackball, isopoint and/or a voice recognition system.

One or more output devices 1024 are also connected to the interface circuit 1020 of the illustrated example. The output devices 1024 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 1020 of the illustrated example, thus, typically includes a graphics driver card, a graphics driver chip or a graphics driver processor.

The interface circuit 1020 of the illustrated example also includes a communication device such as a transmitter, a receiver, a transceiver, a modem and/or network interface card to facilitate exchange of data with external machines (e.g., computing devices of any kind) via a network 1026 (e.g., an Ethernet connection, a digital subscriber line (DSL), a telephone line, coaxial cable, a cellular telephone system, etc.).

The processor platform 1000 of the illustrated example also includes one or more mass storage devices 1028 for storing software and/or data. Examples of such mass storage devices 1028 include floppy disk drives, hard drive disks, compact disk drives, Blu-ray disk drives, RAID systems, and digital versatile disk (DVD) drives.

Coded instructions 1032 to implement the methods of FIGS. 2-5 may be stored in the mass storage device 1028, in the volatile memory 1014, in the non-volatile memory 1016, and/or on a removable tangible computer readable storage medium such as a CD or DVD.

From the foregoing, it will appreciated that the above disclosed methods, apparatus and articles of manufacture relate to creating composite code sequence that effectively represent the component codes used to create the composite code. In some examples, the example signal combining techniques disclosed herein are usable to combine BPSK codes, binary spreading codes (e.g., PRN sequences, pseudo random number sequences). These transmitters and satellites can be built for ranging purposes, navigation purposes, communication purposes, surveillance purposes, etc. The examples disclosed herein provide for a more accurate and efficient space vehicle power design that, in some examples, provides backward compatibility with relatively short receiver integration time. Being backward compatible enables the examples disclosed herein to not reduce the performance of GPS receivers currently being used. The examples disclosed herein provide a more accurate and efficient space vehicle power design by fixing the amount of samples provided for each BPSK code every unit duration with minimal variation (e.g., two samples from component sequence 2 for every unit duration even though the component sequence 2 includes ten samples). The eight samples of the sequence 2 that are not included in the BPSK code are consistently compensated for by giving sequence 2 the higher power in each unit duration, thereby, making the examples disclosed herein an efficient space vehicle power design. The examples disclosed herein can be used to incorporate any number of BPSK codes (e.g., 3, 5, 7, 9, etc.).

In some examples, GPS receivers perform GPS signal acquisition using relatively short integration time because of relatively high platform motion. Relative platform motion describes the changes of light-of-sight instantaneous distances between the GPS satellites and a receiver. In some example, scenarios that experience higher platform motions use GPS receivers that acquire GPS signals using relatively short integration time to maintain receiver acquisition performance. In some examples, composite sequences, such as the ones disclosed herein, are transparent and/or backward compatible with current and past GPS receivers. Because some GPS receivers use short integration time, the composite sequences disclosed herein accurately represent the component sequence according to the respective component code powers in short durations to enable the composite sequence to be backward compatibility.

Because, in some examples, the component sequences are not sample-to-sample represented in the composite sequence, a fixed ratio of samples for the component sequence is maintained throughout a short integration time (e.g., a unit duration) to enable the component sequence to be accurately represented. In some such examples, the number of samples of a component sequence that are not represented in the composite sequence is compensated for by extra power gain provided by the transmitter in GPS satellites. In some examples, if the ratio of samples of a component sequence in each unit duration is steady, known, consistent and/or substantially fixed, a steady, known, consistent and/or substantially fixed amount of power gain used for compensation is also known. Further, in some examples, when the ratio of samples is not as accurately maintained throughout the unit duration, the extra power gain may not be as steady resulting in intentionally higher extra power gain used for compensation. Thus, using the examples disclosed herein, a low and steady and/or consistent number of samples of each component sequence in the composite sequence and the steady and/or consistent power gain for each component sequence enables the examples disclosed herein to be transparent and/or backward compatible with known GPS receivers.

In some examples, the randomizer generates a number of random numbers using a uniform random number generator and then indexes the random numbers from 1 to the number. In some examples, the number of indices also index the samples from the component sequences before index randomization is applied. For example, the indices are 1 to 10; 1 and 2 index the samples from component sequence 2; 3 to 4 index the samples from component sequence 3; and 5 to 10 index the samples from component sequence MV. The randomizer then sorts the number of random numbers in ascending order. In some examples, the randomizer uses the indices of sorted random numbers to compile samples from component sequences into the composite sequence. For example, second of the two samples from component sequence 3 indexed by indices 3 & 4 is the first sample in the composite sequence, second of the two samples from component sequence 2 indexed by indices 1 & 2 will be the second sample in the composite sequence, first of the two samples from component sequence 2 indexed by indices 1 & 2 will be the third sample in the composite sequence, etc.

As set forth herein, an example method includes determining a first number of samples to be contributed into a first unit duration of a composite code sequence from respective component code sequences. The method includes, based on the number of samples determined, randomly selecting samples from a plurality of samples of the respective ones of the component code sequences to enable the selected samples to more accurately represent the plurality of samples of the respective ones of the component code sequences. The method includes compiling the selected samples into the first unit duration of the composite code sequence.

In some examples, determining the first number of samples includes determining the first number of samples using majority vote logic. In some examples, the composite code includes a binary phase shift key code, a binary spreading code, or a pseudo random number sequence. In some examples, the respective component code sequences includes a second component sequence, a third component sequence, and a MV component sequence. In some examples, determining the first number of samples includes determining a second number of samples from the second component code sequence to be contributed to the composite code sequence; determining a third number of samples from the third component code sequence to be contributed to the composite code sequence; and determining a fourth number of samples from the MV component code sequence to be contributed to the composite code sequence.

In some examples, randomly selecting the samples includes randomly selecting first samples from a plurality of first samples of the second component sequence, the number of first samples selected being equal to the second number. The method also includes randomly selecting second samples from a plurality of second samples of the third component sequence, the number of second samples selected being equal to the third number and randomly selecting third samples from a plurality of third samples of the MV component sequence, the number of third samples selected being equal to the fourth number. In some examples, determining the second number of samples from the second component code includes rounding the second number to the nearest integer. In some examples, randomly selecting samples from the plurality of samples of the respective ones of the component code sequences includes selecting a sample having an index that has not been previously selected for the component code sequences.

In some examples, the method includes determining a second number of samples to be contributed into a second unit duration of the composite code sequence from respective ones of the component code sequences. The method includes, based on the second number of samples determined, randomly selecting samples from a plurality of second samples of the respective ones of the component code sequences and compiling the selected samples into the second unit duration of the composite code sequence.

An example apparatus includes a data base to store component code sequences and a processor. Based on the component code sequences obtained from the data base, the processor is to: determine a first number of samples to be contributed into a first unit duration of a composite code sequence from respective ones of the component code sequences; based on the number of samples determined, randomly select samples from a plurality of samples of the respective ones of the component code sequences to enable the selected samples to more accurately represent the plurality of samples of the respective ones of the component code sequences; and compile the selected samples into the first unit duration of the composite code sequence. In some examples, the respective component code sequences include a second component sequence, a third component sequence, and a MV component sequence. In some examples, the composite code includes a binary phase shift key code, a binary spreading code, or a pseudo random number sequence.

In some examples, the processor is to determine the first number of samples by: determining a second number of samples from a second component code sequence to be contributed to the composite code sequence; determining a third number of samples from a third component code sequence to be contributed to the composite code sequence; and determining a fourth number of samples from a MV component code sequence to be contributed to the composite code sequence. In some examples, the processor is to determine the first number of samples by rounding the first number to the nearest integer. In some examples, the processor is to use majority vote logic to determine the first number of samples.

An example method includes determining, via a determiner, a first number of samples to be contributed into a first unit duration of a composite code sequence from respective first, second, and third component code sequences; based on the first number of samples determined, randomly selecting, via a randomizer, the first number of samples from the respective ones of the component code sequences to enable the selected samples to more accurately represent the respective ones of the component code sequences; and compiling, via a compiler, the selected samples into the first unit duration of the composite code sequence, at least one of: a sample from the first component code sequence is disposed between samples from the second component code sequence or between samples from the third component code sequence; a sample from the second component code sequence is disposed between samples from the first component code sequence or between samples from the third component code sequence; or a sample from the third component code sequence is disposed between samples from the first component code sequence or between samples from the second component code sequence.

In some examples, determining the first number of samples includes determining the first number of samples using majority vote logic. In some examples, the composite code includes a binary phase shift key code, a binary spreading code, or a pseudo random number sequence. In some examples, the first, second, and third component code sequences correspond to respective ones of a second component sequence, a third component sequence, and a MV component sequence. In some examples, determining the first number of samples includes: determining a second number of samples from the second component code sequence to be contributed to the composite code sequence; determining a third number of samples from the third component code sequence to be contributed to the composite code sequence; and determining a fourth number of samples from the MV component code sequence to be contributed to the composite code sequence.

In some examples, randomly selecting the samples includes randomly selecting first samples from the second component sequence, the number of first samples selected being equal to the second number; randomly selecting second samples from the third component sequence, the number of second samples selected being equal to the third number; and randomly selecting third samples the MV component sequence, the number of third samples selected being equal to the fourth number. In some examples, determining the second number of samples from the second component code includes rounding the second number to the nearest integer. In some examples, randomly selecting samples from the respective ones of the component code sequences includes selecting a sample having an index that has not been previously selected for the component code sequences. In some examples, the method includes determining a second number of samples to be contributed into a second unit duration of the composite code sequence from respective ones of the component code sequences; based on the second number of samples determined, randomly selecting the second number of samples from the respective ones of the component code sequences; compiling the selected samples into the second unit duration of the composite code sequence.

An example apparatus includes a data base to store first, second, and third component code sequences; and a processor, based on the component code sequences obtained from the data base, to: determine, via a determiner, a first number of samples to be contributed into a first unit duration of a composite code sequence from respective ones of the first, second, and third component code sequences; based on the first number of samples determined, randomly select the first number of samples from the respective ones of the component code sequences to enable the selected samples to more accurately represent the respective ones of the component code sequences; and compile, via a compiler, the selected samples into the first unit duration of the composite code sequence, at least one of: a sample from the first component code sequence is disposed between samples from the second component code sequence or between samples from the third component code sequence; a sample from the second component code sequence is disposed between samples from the first component code sequence or between samples from the third component code sequence; or a sample from the third component code sequence is disposed between samples from the first component code sequence or between samples from the second component code sequence.

In some examples, the first, second, and third, component code sequences correspond to respective ones of a second component sequence, a third component sequence, and a MV component sequence. In some examples, the composite code includes a binary phase shift key code, a binary spreading code, or a pseudo random number sequence. In some examples, the processor is to determine the first number of samples by: determining a second number of samples the second component code sequence to be contributed to the composite code sequence; determining a third number of samples from the third component code sequence to be contributed to the composite code sequence; and determining a fourth number of samples the MV component code sequence to be contributed to the composite code sequence. In some examples, the processor is to determine the first number of samples by rounding the first number to the nearest integer. In some examples, the processor is to use majority vote logic to determine the first number of samples.

An example tangible machine-readable storage medium including instructions which, when executed, cause a machine to at least: determine a first number of samples to be contributed into a first unit duration of a composite code sequence from respective second, third, and MV component code sequences; based on the first number of samples determined, randomly select the first number of samples from a plurality of samples of the respective ones of the component code sequences to enable the selected samples to more accurately represent the respective ones of the component code sequences; and compile the selected samples into the first unit duration of the composite code sequence, at least one of: a sample from the second component code sequence is disposed between samples from the third component code sequence or between samples from the MV component code sequence; a sample from the third component code sequence is disposed between samples from the second component code sequence or between samples from the MV component code sequence; or a sample from the MV component code sequence of samples is disposed between samples from the second component code sequence or between samples from the third component code sequence.

In some examples, the instructions which, when executed, cause a machine to at least: determine a second number of samples from the second component code sequence to be contributed to the composite code sequence; determine a third number of samples from the third component code sequence to be contributed to the composite code sequence; and determine a fourth number of samples from the MV component code sequence to be contributed to the composite code sequence.

In some examples, instructions which, when executed, cause a machine to at least: randomly select first samples from the second component sequence, the number of first samples selected being equal to the second number; randomly select second samples from the third component sequence, the number of second samples selected being equal to the third number; and randomly select third samples the MV component sequence, the number of third samples selected being equal to the fourth number. In some examples, the instructions which, when executed, cause a machine to at least: round the second number to the nearest integer. In some examples, the instructions which, when executed, cause a machine to at least: select a sample having an index that has not been previously selected for the component code sequences.

In some examples, the method includes verifying that two samples having the same index are not selected. In some examples, the verifying that two samples having the same index are not selected includes, after selecting a first sample from one of the component code sequences, preventing the selection of a second sample having a corresponding index from the component code sequences.

An example method includes determining, via a determiner, a first number of samples to be contributed into a first unit duration of a composite code sequence from respective first, second, and third component code sequences; based on the first number of samples determined, randomly selecting, via a randomizer, the first number of samples from the respective ones of the component code sequences, the randomly selecting of the samples from the respective ones of the component code sequences includes selecting a sample having an index that has not been previously selected for the component code sequences; verifying that two samples having the same index are not selected including, after selecting a first sample from one of the component code sequences, preventing the selection of a second sample having a corresponding index from the component code sequences; and compiling, via a compiler, the selected samples into the first unit duration of the composite code sequence, at least one of: a sample from the first component code sequence is disposed between samples from the second component code sequence or between samples from the third component code sequence; a sample from the second component code sequence is disposed between samples from the first component code sequence or between samples from the third component code sequence; or a sample from the third component code sequence is disposed between samples from the first component code sequence or between samples from the second component code sequence, at least one of the determiner, the randomizer, or the compiler including circuitry.

In some examples, determining the first number of samples includes determining the first number of samples using majority vote logic. In some examples, the composite code includes a binary phase shift key code, a binary spreading code, or a pseudo random number sequence. In some examples, the first, second, and third component code sequences correspond to respective ones of a second component sequence, a third component sequence, and a MV component sequence. In some examples, determining the first number of samples includes: determining a second number of samples from the second component code sequence to be contributed to the composite code sequence; determining a third number of samples from the third component code sequence to be contributed to the composite code sequence; and determining a fourth number of samples from the MV component code sequence to be contributed to the composite code sequence.

In some examples, randomly selecting the samples, includes randomly selecting first samples from the second component sequence, the number of first samples selected being equal to the second number; randomly selecting second samples from the third component sequence, the number of second samples selected being equal to the third number; and randomly selecting third samples from the MV component sequence, the number of third samples selected being equal to the fourth number. In some examples, determining the second number of samples from the second component code includes rounding the second number to the nearest integer. In some examples, the method includes determining a second number of samples to be contributed into a second unit duration of the composite code sequence from respective ones of the component code sequences; based on the second number of samples determined, randomly selecting the second number of samples from the respective ones of the component code sequences; compiling the selected samples into the second unit duration of the composite code sequence.

An example apparatus includes a data base to store first, second, and third component code sequences; and a processor including a circuit, the processor, based on the component code sequences obtained from the data base, to: determine, via a determiner, a first number of samples to be contributed into a first unit duration of a composite code sequence from respective ones of the first, second, and third component code sequences; based on the first number of samples determined, randomly select the first number of samples from the respective ones of the component code sequences, the random selection of the samples from the respective ones of the component code sequences includes a sample being selected having an index that has not been previously selected for the component code sequences; verify that two samples having the same index are not selected including, after a first sample from one of the component code sequences is selected, prevent the selection of a second sample having a corresponding index from the component code sequences; and compile, via a compiler, the selected samples into the first unit duration of the composite code sequence, at least one of: a sample from the first component code sequence is disposed between samples from the second component code sequence or between samples from the third component code sequence; a sample from the second component code sequence is disposed between samples from the first component code sequence or between samples from the third component code sequence; or a sample from the third component code sequence is disposed between samples from the first component code sequence or between samples from the second component code sequence.

In some examples, the first, second, and third, component code sequences correspond to respective ones of a second component sequence, a third component sequence, and a MV component sequence. In some examples, composite code includes a binary phase shift key code, a binary spreading code, or a pseudo random number sequence. In some examples, the processor is to determine the first number of samples by: determining a second number of samples from the second component code sequence to be contributed to the composite code sequence; determining a third number of samples from the third component code sequence to be contributed to the composite code sequence; and determining a fourth number of samples from the MV component code sequence to be contributed to the composite code sequence. In some examples, the processor is to determine the first number of samples by rounding the first number to the nearest integer. In some examples, the processor is to use majority vote logic to determine the first number of samples.

An example machine-readable storage device or storage disk including instructions which, when executed, cause a machine to at least: determine a first number of samples to be contributed into a first unit duration of a composite code sequence from respective second, third, and MV component code sequences; based on the first number of samples determined, randomly select the first number of samples from a plurality of samples of the respective ones of the component code sequences, the random selection of the samples from the respective ones of the component code sequences includes a sample being selected having an index that has not been previously selected for the component code sequence; verify that two samples having the same index are not selected including, after a first sample from one of the component code sequences is selected, prevent the selection of a second sample having a corresponding index from the component code sequences; and compile the selected samples into the first unit duration of the composite code sequence, at least one of: a sample from the second component code sequence is disposed between samples from the third component code sequence or between samples from the MV component code sequence; a sample from the third component code sequence is disposed between samples from the second component code sequence or between samples from the MV component code sequence; or a sample from the MV component code sequence of samples is disposed between samples from the second component code sequence or between samples from the third component code sequence.

In some examples, the instructions which, when executed, cause a machine to at least: determine a second number of samples from the second component code sequence to be contributed to the composite code sequence; determine a third number of samples from the third component code sequence to be contributed to the composite code sequence; and determine a fourth number of samples from the MV component code sequence to be contributed to the composite code sequence. In some examples, the instructions which, when executed, cause a machine to at least: randomly select first samples from the second component sequence, the number of first samples selected being equal to the second number; randomly select second samples from the third component sequence, the number of second samples selected being equal to the third number; and randomly select third samples from the MV component sequence, the number of third samples selected being equal to the fourth number. In some examples, the instructions which, when executed, cause a machine to at least: round the second number to the nearest integer.

An example method includes determining, via a determiner, a first number of samples to be contributed into a first unit duration of a composite code sequence from respective first, second, and third component code sequences; based on the first number of samples determined, randomly selecting, via a randomizer, the first number of samples from the respective ones of the first, second, and third component code sequences to enable the selected samples to more accurately represent the respective ones of the first, second, and third component code sequences; and compiling, via a compiler, the selected samples into the first unit duration of the composite code sequence by interspersing a sample from the first component code sequence between samples from the second component code sequence or between samples from the third component code sequence.

In some examples, compiling the selected samples further includes interspersing a sample from the second component code sequence between samples from the first component code sequence or between samples from the third component code sequence. In some examples, compiling the selected samples further includes interspersing a sample from the third component code sequence between samples from the first component code sequence or between samples from the second component code sequence. In some examples, determining the first number of samples includes determining the first number of samples using majority vote logic. In some examples, the composite code sequence includes a binary phase shift key code, a binary spreading code, or a pseudo random number sequence. In some examples, the first, second, and third component code sequences correspond to respective ones of a second component sequence, a third component sequence, and an MV component sequence.

In some examples, determining the first number of samples includes: determining a second number of samples from the second component code sequence to be contributed to the composite code sequence; determining a third number of samples from the third component code sequence to be contributed to the composite code sequence; and determining a fourth number of samples from the MV component code sequence to be contributed to the composite code sequence. In some examples, the randomly selecting of the samples, includes: randomly selecting first samples from the second component sequence, a number of the first samples selected being equal to the second number; randomly selecting second samples from the third component sequence, a number of the second samples selected being equal to the third number; and randomly selecting third samples from the MV component sequence, a number of the third samples selected being equal to the fourth number.

In some examples, determining the second number of samples from the second component code sequence includes rounding the second number to the nearest integer. In some examples, randomly selecting samples from the respective ones of the component code sequences includes selecting a sample having an index that has not been previously selected for the component code sequences. In some examples, the method includes including verifying that two samples having the same index are not selected. In some examples, verifying that two samples having the same index are not selected includes, after selecting a first sample from one of the component code sequences, preventing the selection of a second sample having a corresponding index from the component code sequences.

In some examples, the method includes determining a second number of samples to be contributed into a second unit duration of the composite code sequence from the respective ones of the first, second, and third component code sequences; based on the second number of samples determined, randomly selecting the second number of samples from the respective ones of the first, second, and third component code sequences; and compiling the selected samples into the second unit duration of the composite code sequence by interspersing a sample from the first component code sequence between samples from the second component code sequence or between samples from the third component code sequence.

An example apparatus includes a database to store first, second, and third component code sequences; and a processor, based on the component code sequences obtained from the data base, to: determine a first number of samples to be contributed into a first unit duration of a composite code sequence from the respective first, second, and third component code sequences; based on the first number of samples determined, randomly select the first number of samples from the respective ones of the first, second, and third component code sequences to enable the selected samples to more accurately represent the respective ones of the first, second, and third component code sequences; and compile the selected samples into the first unit duration of the composite code sequence by interspersing a sample from the first component code sequence between samples from the second component code sequence or between samples from the third component code sequence.

In some examples, the processor is to compile the selected samples by interspersing a sample from the second component code sequence between samples from the first component code sequence or between samples from the third component code sequence. In some examples, the processor is to compile the selected samples by interspersing a sample from the third component code sequence between samples from the first component code sequence or between samples from the second component code sequence.

In some examples, the processor is to further: determine a second number of samples to be contributed into a second unit duration of the composite code sequence from the respective ones of the first, second, and third component code sequences; based on the second number of samples determined, randomly select the second number of second samples from the respective ones of the first, second, and third component code sequences; and compile the selected second samples into the second unit duration of the composite code sequence by interspersing a sample from the first component code sequence between samples from the second component code sequence or between samples from the third component code sequence.

An example machine-readable storage device or storage disk comprising instructions which, when executed, cause a machine to at least: determine a first number of samples to be contributed into a first unit duration of a composite code sequence from respective first, second, and third component code sequences; based on the first number of samples determined, randomly select the first number of samples from the respective ones of the first, second, and third component code sequences to enable the selected samples to more accurately represent the respective ones of the first, second, and third component code sequences; and compile the selected samples into the first unit duration of the composite code sequence by interspersing a sample from the first component code sequence between samples from the second component code sequence or between samples from the third component code sequence.

In some examples, the instructions which, when executed, cause a machine to at least: compile the selected samples by interspersing a sample from the second component code sequence between samples from the first component code sequence or between samples from the third component code sequence. In some examples, instructions which, when executed, cause a machine to at least: compile the selected samples by interspersing a sample from the third component code sequence between samples from the first component code sequence or between samples from the second component code sequence. In some examples, the instructions which, when executed, cause a machine to at least: determine a second number of samples to be contributed into a second unit duration of the composite code sequence from the respective ones of the first, second, and third component code sequences; based on the second number of samples determined, randomly select the second number of second samples from the respective ones of the first, second, and third component code sequences; and compile the selected second samples into the second unit duration of the composite code sequence by interspersing a sample from the first component code sequence between samples from the second component code sequence or between samples from the third component code sequence.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method, comprising:
   determining, via a determiner, a first number of samples to be contributed into a first unit duration of a composite code sequence from respective first, second, and third component code sequences;
   based on the first number of samples determined, randomly selecting, via a randomizer, the first number of samples from the respective ones of the first, second, and third component code sequences to enable the selected samples to more accurately represent the respective ones of the first, second, and third component code sequences; and
   compiling, via a compiler, the selected samples from the first, second, and third component code sequences into the first unit duration of the composite code sequence, at least one of the determiner, the randomizer, and the compiler includes circuity, wherein randomly selecting the first number of samples from the respective ones of the component code sequences includes selecting a sample having an index that has not been previously selected for the component code sequences; and
   verifying that two samples having the same index are not selected, wherein verifying that two samples having the same index are not selected includes, after selecting a first sample from one of the component code sequences, preventing the selection of a second sample having a corresponding index from the component code sequences.

2. The method of claim 1, wherein compiling the selected samples further includes interspersing a sample from the second component code sequence between samples from the first component code sequence or between samples from the third component code sequence.

3. The method of claim 1, wherein compiling the selected samples further includes interspersing a sample from the third component code sequence between samples from the first component code sequence or between samples from the second component code sequence.

4. The method of claim 1, wherein determining the first number of samples includes determining the first number of samples using majority vote logic.

5. The method of claim 1, wherein the composite code sequence includes a binary phase shift key code, a binary spreading code, or a pseudo random number sequence.

6. The method of claim 1, wherein the first, second, and third component code sequences correspond to respective ones of a second component sequence, a third component sequence, and an MV component sequence.

7. The method of claim 6, wherein determining the first number of samples includes:
   determining a second number of samples from the second component code sequence to be contributed to the composite code sequence;
   determining a third number of samples from the third component code sequence to be contributed to the composite code sequence; and
   determining a fourth number of samples from the MV component code sequence to be contributed to the composite code sequence.

8. The method of claim 7, wherein the randomly selecting of the samples, includes:
   randomly selecting first samples from the second component sequence, a number of the first samples selected being equal to the second number;
   randomly selecting second samples from the third component sequence, a number of the second samples selected being equal to the third number; and
   randomly selecting third samples from the MV component sequence, a number of the third samples selected being equal to the fourth number.

9. The method of claim 7, wherein determining the second number of samples from the second component code sequence includes rounding the second number to the nearest integer.

10. The method of claim 1, further including:
    determining a second number of samples to be contributed into a second unit duration of the composite code sequence from the respective ones of the first, second, and third component code sequences;
    based on the second number of samples determined, randomly selecting the second number of samples from the respective ones of the first, second, and third component code sequences; and
    compiling the selected samples into the second unit duration of the composite code sequence by interspersing a sample from the first component code sequence between samples from the second component code sequence or between samples from the third component code sequence.

11. An apparatus, comprising:
a database to store first, second, and third component code sequences; and
a processor, based on the component code sequences obtained from the data base, to:
  determine, via a determiner, a first number of samples to be contributed into a first unit duration of a composite code sequence from the respective first, second, and third component code sequences;
  based on the first number of samples determined, randomly select, via a randomizer, the first number of samples from the respective ones of the first, second, and third component code sequences to enable the selected samples to more accurately represent the respective ones of the first, second, and third component code sequences;
  compile, via a compiler, the selected samples into the first unit duration of the composite code sequence, at least one of the determiner, the randomizer, and the compiler includes circuity, wherein randomly selecting the first number of samples from the respective ones of the component code sequences includes selecting a sample having an index that has not been previously selected for the component code sequences; and
  verify that two samples having the same index are not selected, wherein verifying that two samples having the same index are not selected includes, after selecting a first sample from one of the component code sequences, preventing the selection of a second sample having a corresponding index from the component code sequences.

12. The apparatus of claim 11, wherein the processor is to compile the selected samples by interspersing a sample from the second component code sequence between samples from the first component code sequence or between samples from the third component code sequence.

13. The apparatus of claim 11, wherein the processor is to compile the selected samples by interspersing a sample from the third component code sequence between samples from the first component code sequence or between samples from the second component code sequence.

14. The apparatus of claim 11, wherein the processor is to further:
determine a second number of samples to be contributed into a second unit duration of the composite code sequence from the respective ones of the first, second, and third component code sequences;
based on the second number of samples determined, randomly select the second number of second samples from the respective ones of the first, second, and third component code sequences; and
compile the selected second samples into the second unit duration of the composite code sequence by interspersing a sample from the first component code sequence between samples from the second component code sequence or between samples from the third component code sequence.

15. A machine-readable storage device or storage disk comprising instructions which, when executed, cause a machine to at least:
determine a first number of samples to be contributed into a first unit duration of a composite code sequence from respective first, second, and third component code sequences;
based on the first number of samples determined, randomly select the first number of samples from the respective ones of the first, second, and third component code sequences to enable the selected samples to more accurately represent the respective ones of the first, second, and third component code sequences;
compile the selected samples into the first unit duration of the composite code sequence, wherein randomly selecting the first number of samples from the respective ones of the component code sequences includes selecting a sample having an index that has not been previously selected for the component code sequences; and
verify that two samples having the same index are not selected, wherein verifying that two samples having the same index are not selected includes, after selecting a first sample from one of the component code sequences, preventing the selection of a second sample having a corresponding index from the component code sequences.

16. The machine-readable storage device or storage disk of claim 15 comprising instructions which, when executed, cause a machine to at least: compile the selected samples by interspersing a sample from the second component code sequence between samples from the first component code sequence or between samples from the third component code sequence.

17. The machine-readable storage device or storage disk of claim 15 comprising instructions which, when executed, cause a machine to at least: compile the selected samples by interspersing a sample from the third component code sequence between samples from the first component code sequence or between samples from the second component code sequence.

* * * * *